United States Patent [19]
Hazen et al.

[11] 3,848,568
[45] Nov. 19, 1974

[54] RIBBED FLOOR AND METHOD OF WASTE REMOVAL

[75] Inventors: Thamon E. Hazen, Ames, Iowa; John R. Miner, Corvallis, Oreg.

[73] Assignee: Iowa State University Research Foundation, Inc., Ames, Iowa

[22] Filed: Dec. 29, 1972

[21] Appl. No.: 319,212

[52] U.S. Cl. ............................................... 119/28
[51] Int. Cl. ........................................... A01k 01/00
[58] Field of Search .................... 119/28, 16, 15, 22

[56] References Cited
UNITED STATES PATENTS

| | | | |
|---|---|---|---|
| 830,842 | 9/1906 | Makowski | 119/28 |
| 927,467 | 7/1909 | Fargo | 119/28 |
| 3,225,737 | 12/1965 | Biehl | 119/16 |

*Primary Examiner*—Hugh R. Chamblee
*Attorney, Agent, or Firm*—Zarley, McKee & Thomte

[57] ABSTRACT

A ribbed floor comprising a continuous sheet material having elongated channels formed therein and positioned upon a floor section which slopes slightly downwardly from an upper end portion to a lower end portion. A liquid distribution compartment or pipe extends substantially across the upper end portion of the floor section and has a plurality of liquid communication openings in operative liquid engagement with the upper ends of the channels. A dosing siphon means or the like is provided which is adapted to introduce a flushing liquid into the liquid distribution compartment at a rate more rapidly than liquid can flow outwardly through the liquid communication openings to provide a sustained flushing of the channels for a period of time greater than the period that liquid is introduced into the distribution compartment. Two forms of the channels are disclosed to achieve the necessary flushing of the waste material therefrom. The method of removing the animal waste is disclosed and comprises introducing liquid into the intake end of the channels so that the mean velocity of the liquid flowing in the channels is between one and three feet per second. The supply of liquid is maintained in the channels for a period of time substantially equal to the time that transpires for a quantity of the liquid to flow from the intake end to the discharge end of the channels at the mean velocity.

4 Claims, 5 Drawing Figures

PATENTED NOV 19 1974 3,848,568

3,848,568

RIBBED FLOOR AND METHOD OF WASTE REMOVAL

BACKGROUND OF THE INVENTION

Swine producers prefer not to be bothered with handling swine wastes. It is desirable to have a waste management system which is reliable and labor free. Many systems have been provided for removing the waste matter from the swine confinement pens but these systems have many disadvantages. One such disadvantage of conventional systems is that the animals can come into direct contact with the manure which is being flushed down a dunging channel from proceding pens. A further disadvantage of the conventional systems is that the dunging channels are not sufficiently flushed so as to remove the waste matter therein.

Therefore, it is a principal object of the invention to provide an improved floor design for an animal confinement area.

A further object of the invention is to provide a ribbed floor design and method of waste removal.

A further object of the invention is to provide a ribbed floor for an animal confinement pen which has flushing channels provided therein so designed so as to permit the efficient removal of the waste matter therein.

A further object of the invention is to provide a ribbed floor which permits the removal of waste matter therefrom without an excess of water being required.

A further object of the invention is to provide a method of waste removal wherein the mean velocity of the flushing liquid flowing in the channels is between one and three feet per second.

A further object of the invention is to provide a method of waste removal wherein the flushing liquid is maintained in the channels for a period of time substantially equal to the time that transpires for a quantity of the liquid to flow from the intake end to the discharge end of the channels at the mean velocity of the liquid.

A further object of the invention is to provide a ribbed floor and method of waste removal which is highly efficient.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENTS

Figure 1:
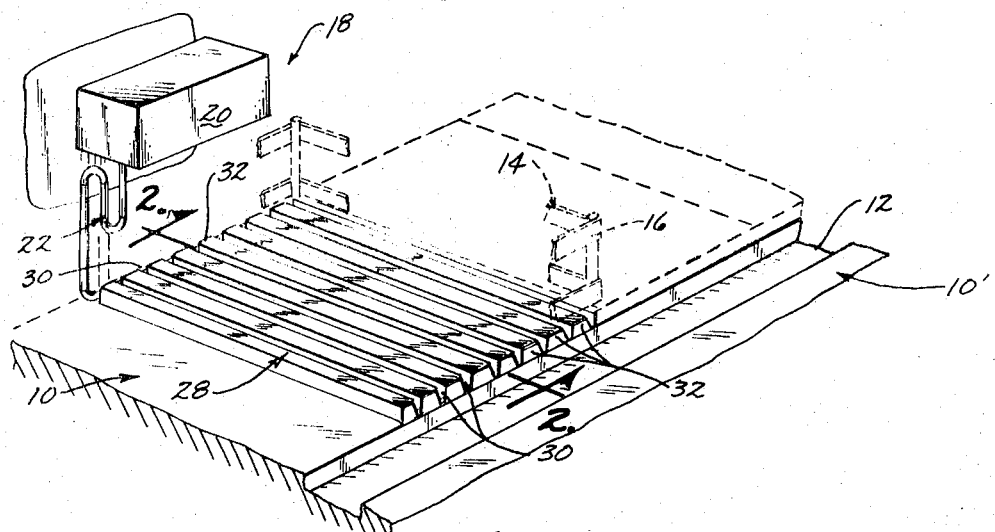
FIG. 1 is a perspective view of the ribbed floor of this invention.
Figure 2:
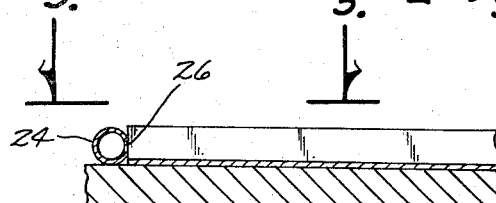
FIG. 2 is an enlarged sectional view seen along lines 2—2 of FIG. 1.
Figure 3:
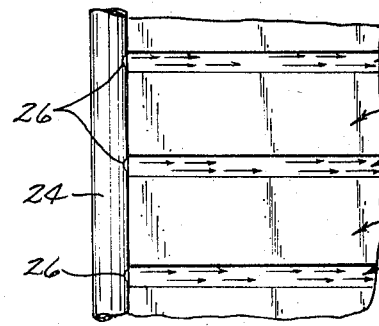
FIG. 3 is a view seen along lines 3—3 of FIG. 2.

The numeral 10 refers to a concrete floor section or the like which slopes slightly to a gutter 12. If desired, a concrete floor section 10' may also be provided which also slopes towards the gutter 12. As will be explained hereinafter, gutter 12 collects the flow from the floor sections 10 and 10' and provides an exit for the waste water from the building. Preferably, the floor section is divided into individual confinement areas by any convenient means such as gates 14 or the like. Gate 14 should be provided with an end gate portion 16 for convenience.

The numeral 18 generally designates a flush system for intermittently rapidly supplying flushing water to the confinement area to aid in transporting the animal waste from the area into the gutter. System 18 comprises a flush tank 20 for the storage of flush water. Tank 20 is in communication with a source of flush water such as recycled waste water and is filled with conventional equipment at the desired rate. Flush system 18 includes conventional means for periodically flushing the tank 20 such as a dosing siphon means 22 which flushes the tank 20 intothe fluid distribution compartment or manifold pipe 24 at a controlled frequency and rate. The frequency is dependent on the rate at which the tank is filled and can be varied as desired. It is preferred that the flush system operate so as to flush every hour. However, it is possible to only flush the system once every four hours with once every twenty-four hours being the minimum.

Pipe 24 is provided with a plurality of spaced apart liquid communication openings 26 formed therein. As illustrated in the drawings, a slotted or ribbed floor section 28 is positioned on the floor section 10 which has an upper end portion 30 and a lower end portion 32. Preferably, the floor section 28 should have a length of approximately 19 to 20 feet and a width of approximately 4 feet, 7 inches. Obviously, the number of floor sections 28 that will be employed on the floor section 10 will be dependent on the size of the building in which the system is utilized.

Figure 4:
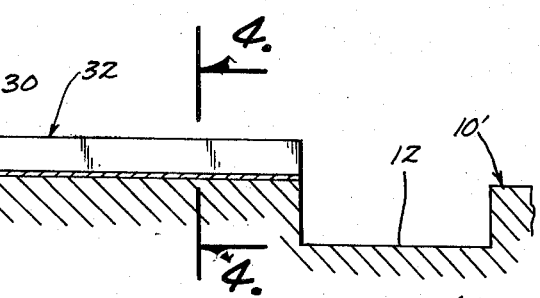
FIG. 4 is an enlarged sectional view seen along lines 4—4 of FIG. 2.
Figure 5:
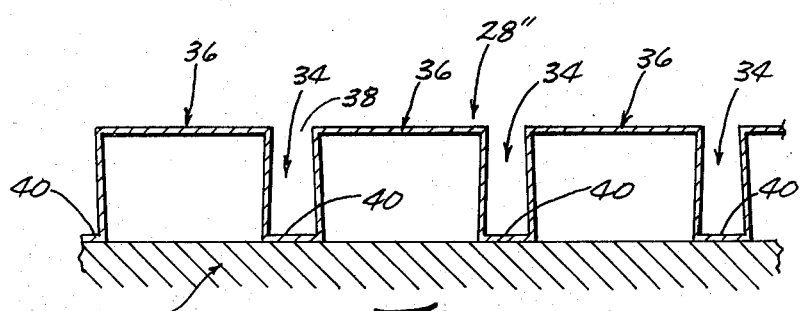
FIG. 5 is a sectional view similar to FIG. 4 except that the modified form of the ribbed floor is illustrated.

The drawings illustrate two forms of the floor section 28. FIG. 4 illustrates a floor section 28' while FIG. 5 illustrates a floor section 28''. Floor section 28' is preferably formed of a continuous sheet metal material bent so as to provide flush channels 30 between the slat portions 32. The design geometry of the channels 30 is critical. Channel 30 has an upper width 34 which is between 1¼ and 1⅜ inches. Channel 30 has a lower width which is between ¾ inch to 1 inch. The depth of channel 30 must be at least as deep as the maximum width of the channel 30 and may be as deep as 2½ times the maximum width of the channel. It has been found that depths greater than 2½ times the maximum width do not add to the efficiency of the system. It has been found that a satisfactory depth for channel 30 is 3 inches and that a satisfactory width of the slat portion is 4¾ inches.

The floor section 28'' of FIG. 5 is the most efficient floor section disclosed and the preferred form of the invention. Floor section 28'' is preferably formed on a continuous sheet material bent so as to provide flush channels 34 between the slat portions 36. The design geometry of the channels 34 is critical. Channel 34 has an upper width 38 which is between 1¼ and 1⅜ inches. Channel 34 has a lower width 40 which is between 1¼ and 1½ inches. The depth of channel 34 must be at least as deep as the maximum width of the channel 34 and may be as deep as 2½ times the maximum width of the channel. Depths greater than 2½ times the maximum width do not add to the efficiency of the system. A satisfactory depth for channel 34 is 3 inches and a satisfactory width for slat portions 36 is 4¾ inches. A non-slip material should be provided on the slat portions of both of the floor sections to provide sufficient footing for the animals.

As previously stated, the flush system 18 is designed to periodically supply flushing water to the manifold pipe 24 so that the flushing water will be passed outwardly through the openings 26 into each of the channels 30 or 34. The flush system introduces the flushing liquid into the manifold pipe 24 at a rate more rapidly than the flushing water can flow outwardly through the openings 26 so that a sustained flushing of the channels is provided for a period of time which is greater than the period that the flush water is introduced into the manifold pipe 24. The flush water must be introduced into the channels so that the mean velocity of the flush water flowing in the channels is between 1 and 3 feet per second. It is preferred that the mean velocity be between 1½ and 2½ feet per second. The supply of flush water into the channels is sustained for a period of time which is substantially equal to the time that transpires for a quantity of the flush water to flow from the upper end of the channel to the lower end of the channel at the said mean velocity.

The slope of the floor must be such that the flush water will flow to the gutter and a 1 per cent slope has been found to be satisfactory. The animal waste falls into the channels and is periodically flushed therefrom into the gutter for subsequent removal from the area. The relationship of the geometry of the flush channels and the mean velocity of the water flowing therethrough is critical so as to achieve the proper removal of the waste material which has fallen thereinto. Thus it can be seen that the ribbed or slotted floor and the method of waste removal accomplishes at least all of its stated objectives.

I claim:

1. A floor and waste disposal system for animals, comprising,
   a floor section sloping approximately one degree downwardly from an upper end portion to a lower end portion, said floor section having in at least a substantial center portion a plurality of elongated spaced apart narrow channels extending longitudinally from said upper end portion towards said lower end portion, each of said channels having a top width, a bottom width and a depth,
   said top width being less than said bottom width and being within the range of from about 1¼ to about 1⅜,
   said depth being at least equal to the maximum width of said channel,
   a liquid distribution compartment extending substantially across the upper end portion of said floor section, said compartment having liquid communication openings in operative liquid communication with the upper ends of said channels,
   and means for intermittently rapidly introducing a flushing liquid into said liquid distribution compartment.

2. The system of claim 1 wherein said bottom width is approximately 1½ inches.

3. A floor and waste disposal system for animals, comprising,
   a floor section sloping approximately one degree downwardly from an upper end portion to a lower end portion, said floor section having in at least a substantial center portion a plurality of elongated spaced apart narrow channels extending longitudinally from said upper end portion towards said lower end portion, each of said channels having a top width, a bottom width and a depth,
   said top width being greater than said bottom width and being within the range of from 1¼ to about 1⅜,
   said depth being greater upto 2½ times the maximum width of said channel, and said channels being spaced apart a distance greater than the maximum width of the channel,
   a liquid distribution compartment extending substantially across the upper end portion of said floor section, said compartment having liquid communication openings in operative liquid communication with the upper ends of said channels,
   and means for intermittently rapidly introducing a flushing liquid into said liquid distribution compartment.

4. The system of claim 3 wherein said bottom width is approximately 1 inch.

* * * * *

UNITED STATES PATENT OFFICE
CERTIFICATE OF CORRECTION

Patent No. 3,848,568                     Dated November 19, 1974

Inventor(s) Thamon E. Hazen et al.

It is certified that error appears in the above-identified patent and that said Letters Patent are hereby corrected as shown below:

Column 4, line 5, after the fraction 1 and 1/4, insert "inches".

Column 4, line 6, after the fraction 1 and 3/8, insert "inches".

Column 4, line 30, after the fraction 1 and 1/4, insert "inches".

Column 4, line 30, after the fraction 1 and 3/8, insert "inches".

Signed and sealed this 11th day of March 1975.

(SEAL)
Attest:

RUTH C. MASON
Attesting Officer

C. MARSHALL DANN
Commissioner of Patents
and Trademarks